United States Patent [19]

Oonishi

[11] Patent Number: 4,838,672
[45] Date of Patent: Jun. 13, 1989

[54] FUNCTION-CONVERSION DEVICE FOR GROUND MONOCULAR TELESCOPE

[76] Inventor: Toshiaki Oonishi, 18-33, Tokumaru 2-chome, Itabashi-ku, Tokyo, Japan

[21] Appl. No.: 167,243

[22] Filed: Mar. 11, 1988

[30] Foreign Application Priority Data

Mar. 11, 1987 [JP] Japan .............................. 62-35592[U]

[51] Int. Cl.$^4$ .................. G02B 23/00; G02B 7/02; G02B 15/02; G02B 27/32
[52] U.S. Cl. .................... 350/537; 350/247; 350/254; 350/559; 350/566
[58] Field of Search ............... 350/247, 254, 537, 559, 350/562, 565, 566, 545, 576, 569

[56] References Cited

U.S. PATENT DOCUMENTS

| 409,927 | 8/1889 | Clements | 350/559 |
|---|---|---|---|
| 1,042,346 | 10/1912 | Henle | 350/559 |
| 1,553,211 | 9/1925 | Barr et al. | 350/559 |
| 2,531,956 | 11/1950 | Waldorf et al. | 350/422 |

FOREIGN PATENT DOCUMENTS

| 0083698 | 1/1920 | Switzerland | 350/566 |
|---|---|---|---|
| 561597 | 5/1944 | United Kingdom | 350/422 |

Primary Examiner—Bruce Y. Arnold
Assistant Examiner—Ronald M. Kachmarik
Attorney, Agent, or Firm—Wenderoth, Lind & Ponack

[57] ABSTRACT

A function-conversion device for a ground monocular telescope of an erecting-prism type ground monocular telescope. The device includes a rotational plate so mounted as to be horizontally movable in a vicinity of the focal plane of the objective lens of the telescope, with a plurality of windows being provided in the rotational plate and with a reticle and/or a visibility diphragm or a second objective lens being mounted in alignment with the windows. This arrangement provides a convenient and easy-to-handle function-conversion device since the windows can be selectively moved into the vicinity of the focal plane.

11 Claims, 4 Drawing Sheets

FUNCTION-CONVERSION DEVICE FOR GROUND MONOCULAR TELESCOPE

BACKGROUND OF THE INVENTION

1. Field of the Invention

This invention relates to a function-conversion device for the ground monocular telescope and more specifically to a convenient and easy-to-operate function-conversion device for a ground monocular telescope operating on the erecting-prism principle of wherein a reticle removal/mounting, a visibility diaphragm, magnification change or other functions are integrated.

2. Description of the Prior Art

Conventionally, the ground monocular telescopes operating on the erecting-prism principle have been in extensive use, due to their ease of handling, brightness sufficient for observation purposes, and other advantages. They have normally found their applications in the observation of wild birds, shooting matches and other purposes, because of their reduced weight and ease of operation.

Such ground monocular telescopes operating on the erecting-prism principle have had difficulties in adjusting visibility and field of view in multiple stages, despite their peerless capabilities.

For instance, as is well known, a reticle is mounted in order to determine the distance to a particular object. In the case of the telescope under consideration, it would be impossible to mount a reticle only when it was necessary, and thus it had to be in a mounted state at all times. This resulted in the obstruction by the scales of the reticle to the view of the observer except while a distance was being measured.

These are shortcomings of an erecting-prism type ground monocular telescope which can result inevitably from its advantages. For this reason, in the conventional system, there was nothing which could be done for it but to make the visibility and field-of-view adjustment function exceedingly simple, because a reticle was not free to be mounted or removed, as well as the magnification adjustment could be done only in a single stage.

Accordingly, an erecting-prism type ground telescope incorporating multiple visibility and field-of-view adjustment functions, has been strongly desired.

With the above taken into account, the object of the present invention is to provide a convenient, and easy-to-handle function-conversion device for an erecting-prism type ground monocular telescope, which is designed to overcome the defects from which the conventional equipment has suffered, and to select appropriate levels of visibility and field-of-view.

SUMMARY OF THE INVENTION

In an erecting-prism type ground monocular telescope, a function-conversion device according to the present invention has a rotational plate so mounted as to be horizontally movable in the vicinity of the focal plane of an objective lens, with a plurality of windows being equipped with said rotational plate and with a reticle and/or a visibility diaphragm or a second objective lens being mounted onto said windows.

This equipments makes it possible to use a reticle for the observation of a distance only when it is required, and also makes it easier to change magnifications.

DETAILED DESCRIPTION OF THE PREFERRED EMBODIMENTS

In the above drawings, 1 and 2 each represent a prism, 3 an objective lens, 4 an ocular lens, 5 a rotational plate, 6 the center of rotation (rotation axis), 7 and 8 each designate a window, 9 a reticle, 10 a visibility diaphragm, 11 a turning ring, 12 a pin, 13 a rotational plate, 14 and 15 each designate a window, 16 a second objective lens, 17 a cover, 18 a turning ring, 19 a notch and 20 a notch.

Figure 1:
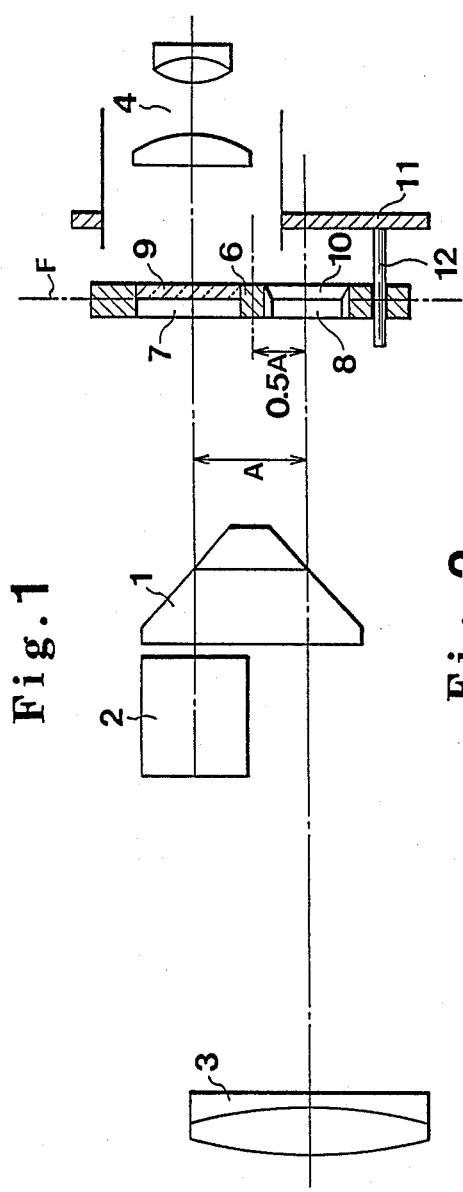
FIG. 1 is a conceptual drawing of one embodiment of the present invention.

Referring now in detail to the drawings, FIG. 1 shows the principle of the function-conversion device according to the preset invention. As indicated in FIG. 1, in an optical system comprising prisms 1 and 2, an objective lens 3 and an ocular lens 4, a rotational plate 5 capable of moving horizontally towards and away from the objective lens 3 is provided in the vicinity of the focal point (F) of the objective lens 3. The rotation axis or central point 6 of said rotational plate 5 is located at approximately one-half of the displacement of the rays of light emitting from said optical system(A).

Figure 2:
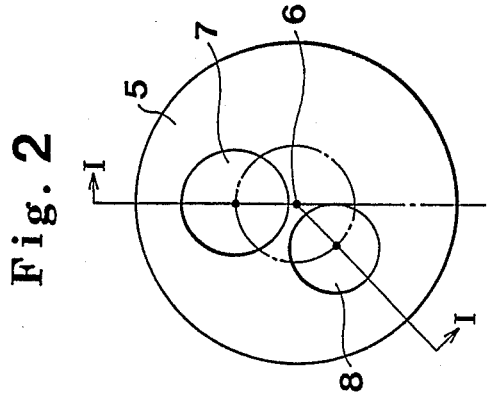
FIG. 2 is a plan view of the rotational plate shown in FIG. 1.

The rotational plate 5 has windows 7 and 8 as in the case of FIG. 1. Said rotational plate 5 exhibits the cross section along I—I in FIG. 2. The window 7 is equipped with a reticle 9, and the window 8 with a visibility diaphragm 10.

Rotation of the rotational plate 5 can be accomplished by, for instance, causing a rotary ring (turning ring) 11 equipped with a pin 12 to rotate.

Figure 3:
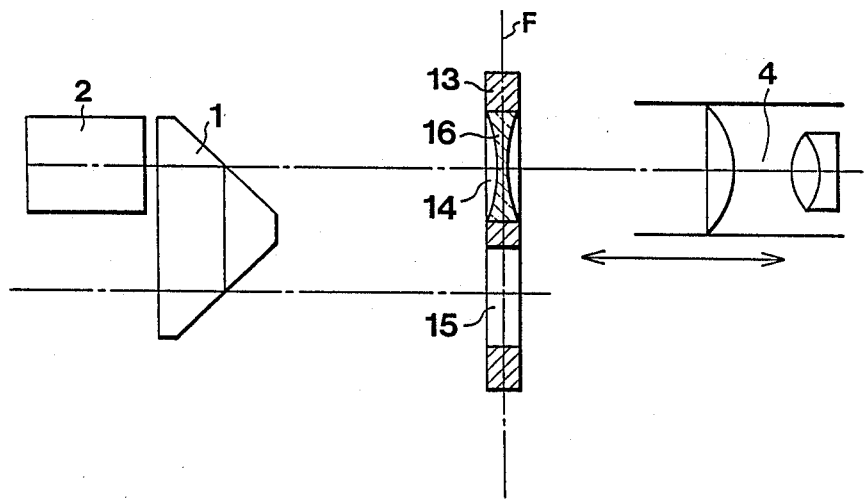
FIG. 3 shows a conceptual drawings of another embodiment of the present invention.
Figure 4:
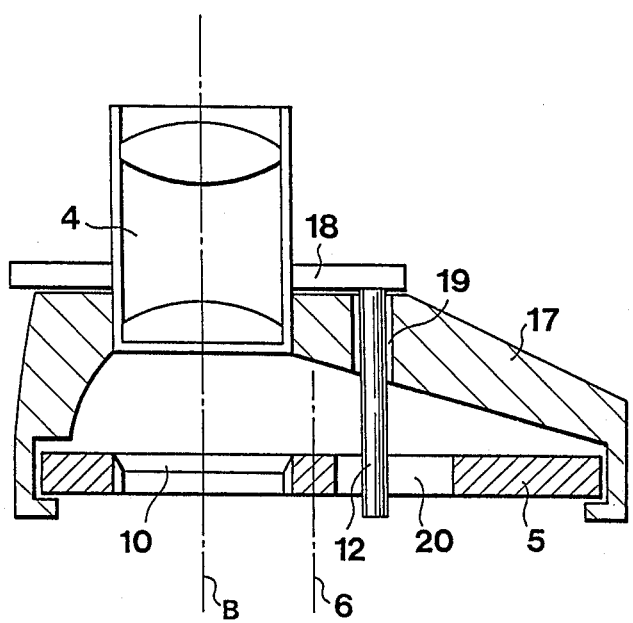
FIG. 4 is a cross-sectional view of an essential portion of the present invention illustrating an example of the construction hereof.

FIG. 3 shows an embodiment wherein a second objective lens 16 is provided so as to be aligned with either of the windows 14 and 15 of a rotational plate 13. In this case, the adjustment for the focal point (F) can be readily accomplished by means of a sliding mechanism of the ocular lens 4 and/or objective lens 3 such as by moving the ocular lens 4 toward and away from the plate 13. When said second objective lens 16 is adopted, a difference in focal point occurs, and accordingly, the rectilinear movement of said ocular lens 4 in the direction toward the said rotational plate 13 may be adjusted with a sliding mechanism such that the second objective lens 16 comes close to said ocular lens 4.

This arrangement permits adjustment of the difference in focal point.

The construction of a means which enables the rotational plate 5 to rotate as show in FIG. 1 is illustrated in FIG. 3, which is only one example of such an arrangement.

The rotational plate 5 turns around the central point 6. An ocular lens system 4 has a turning ring 18 mounted rotatably on a cover 17 so as to rotate above a turning axis. Said turning ring 18 has a pin 12, said pin 12 being inserted into semi-annular notch 19 in said cover, and also into a radially extending notch 20 in said rotational plate 5.

Figure 5:
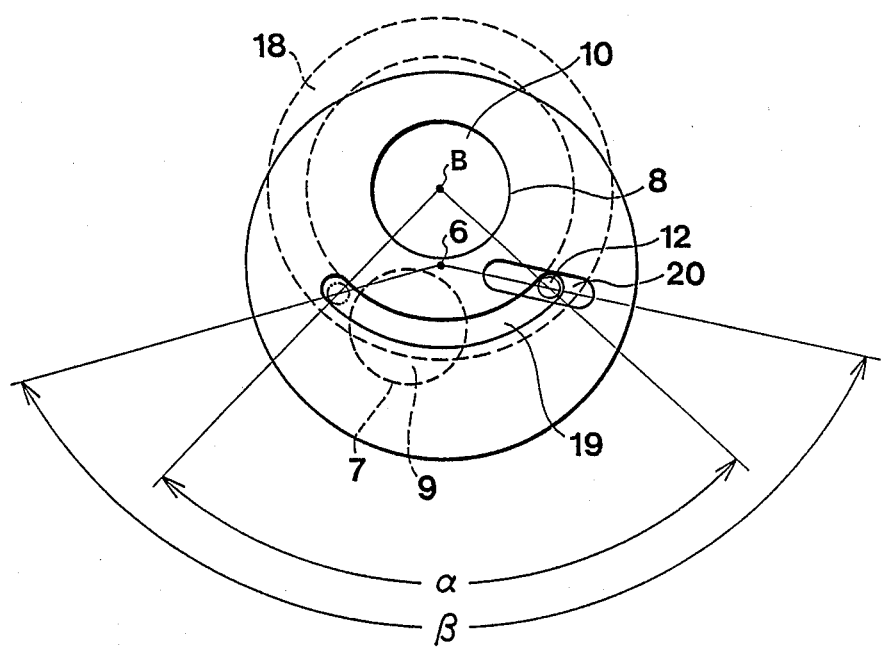
FIG. 5 is a plan view of the rotational plate as indicated in FIG. 4.

FIG. 5 shows said rotational plate 5 in the present embodiment.

In this example, the window 8 equipped with a visibility diaphragm 10 is mounted in the light path opposed to the prism. A pin 12 is provided with a turning ring 18, and the pin 12 is caused to move along the notch 20 of the rotational plate 5 in synchronization with the rotation of said turning ring 18 around the turning axis which is coincident with a central point(B).

To locate a window 7 on which a reticle 9 is mounted at the central point, said turning ring 18 is caused to rotate such that the pin 12 is moved through an angular displacement of about 90° about the turning axis B (angle α) and the pin 20 is located the left side of FIG. 5. The window 7 is thus rotated about 150° about the rotation axis 6 (Angle β).

It is, of course to be understood that the form of my invention herein shown and described is to be taken as a preferred example of the same and that various changes in the shape, size and arrangement of parts may be resorted to.

The conversion equipment of the present invention makes it is possible to integrate a reticle, a visibility diaphragm, magnification change and other functions, serving to improve the utility of an erecting-prism system as a ground monocular telescoping and achieve a multi-function and easy to handle telescope.

What I claim is:

1. A function-conversion device for an erecting-prism type ground monocular telescope including a rotational plate so mounted as to be horizontally movable toward and away from an objective lens of the telescope so that the rotational plate can be located in the vicinity of the focal plane of the objective lens, a plurality of windows being provided in said rotational plate and an element selected from the group consisting of a reticle, a visibility diaphragm and a second objective lens mounted on the rotational plate in alignment with one of said windows, each of said windows being selectively movable to a position in alignment with the focal plane of the objective lens.

2. The device of claim 1, further comprising an ocular lens mounted for horizontal movement with respect to the rotational plate by a sliding mechanism.

3. The device of claim 1, further comprising a turning ring rotatably mounted about a turning axis, said rotational plate being rotatable about a rotation axis which is substantially parallel to said turning axis, said turning ring being coupled to said rotational plate such that rotation of said turning ring effects rotation of said rotational plate.

4. The device of claim 3, wherein said turning axis is offset from said rotation axis.

5. The device of claim 4, wherein said turning ring is coupled to said rotational plate by means of a pin extending from said turning ring and engaging a notch in said rotational plate.

6. The device of claim 5, wherein said pin extends axially in a direction substantially parallel to said turning axis and said notch comprises a slot which extends radially in a direction substantially perpendicular to said turning axis.

7. The device of claim 6, further comprising a cover rotatably supporting said rotational plate, said cover having a semi-annular notch therein through which said pin extends, said pin being movable along said semi-annular notch upon rotation of said turning ring.

8. The device of claim 1, wherein said reticle is mounted in alignment with one of said windows and said visibility diaphragm is mounted in alignment with another one of said windows.

9. The device of claim 1, wherein one of said windows is empty and said second objective lens is mounted in alignment with another one of said windows.

10. The device of claim 1, wherein said windows are angularly offset with respect to each other and each of said windows is radially offset from said rotation axis.

11. The device of claim 1, wherein said objective lens is movable rectilinearly toward and away from said rotational plate.

* * * * *